United States Patent
Hsu et al.

(10) Patent No.: US 8,905,473 B2
(45) Date of Patent: Dec. 9, 2014

(54) SEAT ADJUSTING MODULE

(75) Inventors: Che-Wei Hsu, New Taipei (TW); Hui-Yuan Su, Kaohsiung (TW)

(73) Assignee: Giant Manufacturing Co., Ltd., Taichung (TW)

( * ) Notice: Subject to any disclaimer, the term of this patent is extended or adjusted under 35 U.S.C. 154(b) by 670 days.

(21) Appl. No.: 13/006,444

(22) Filed: Jan. 14, 2011

(65) Prior Publication Data

US 2012/0181824 A1  Jul. 19, 2012

(51) Int. Cl.
*B62J 1/08* (2006.01)

(52) U.S. Cl.
CPC ........................................ *B62J 1/08* (2013.01)
USPC .................................. 297/195.1; 297/215.14

(58) Field of Classification Search
CPC .......................................................... B62J 1/08
USPC ......................................... 297/195.1, 215.14
See application file for complete search history.

(56) References Cited

U.S. PATENT DOCUMENTS

| | | | | |
|---|---|---|---|---|
| 4,275,922 A | * | 6/1981 | Juy ...................... | 297/215.14 X |
| 5,664,829 A | * | 9/1997 | Thomson et al. ........ | 297/215.14 |
| 7,559,603 B1 | * | 7/2009 | Chiang ................. | 297/215.14 X |
| 7,559,604 B2 | * | 7/2009 | Beaulieu ................. | 297/215.14 |

FOREIGN PATENT DOCUMENTS

| | | |
|---|---|---|
| TW | M326912 | 2/2008 |
| TW | 201010899 | 3/2010 |

OTHER PUBLICATIONS

"Office Action of Taiwan Counterpart Application", issued on Nov. 19, 2012, p. 1-p. 5.

* cited by examiner

*Primary Examiner* — Anthony D Barfield
(74) *Attorney, Agent, or Firm* — Jianq Chyun IP Office

(57) ABSTRACT

A seat adjusting module suitable to connect the saddle including at least a seat rail and a seat tube of a bicycle is provided, wherein the module includes a base assembled to an end of the seat tube, a clamp unit including two clamp elements and a fastening unit including two fasteners. The first clamp element has at least a first clamp portion and a shaft portion matched to the base at a first or a second position so as to rotate relatively to the base on a first or a second rotation axis. The second clamp element has at least a second clamp portion, which with the first clamp portion together clamps the seat rail. The two fasteners together fasten the two clamp elements to the base so that the first and second clamp portions together clamp tightly the seat rail.

10 Claims, 10 Drawing Sheets

SEAT ADJUSTING MODULE

BACKGROUND OF THE INVENTION

1. Field of the Invention

The invention generally relates to a seat adjusting module, and more particularly, to a seat adjusting module of a bicycle.

2. Description of Related Art

Usually, the saddle position of a bicycle relative to the seat tube can be adjusted by translating or rotating the adjusting module relatively to the seat tube, and the position should be adapted to different figure types of riders so as to increase the riding comfort.

In order to adjust the position of the saddle relative to the seat tube, only the fastener of the adjusting module needs to be unfastened, so that the seat rail of the saddle can be translated or rotated relatively to the seat tube. Once the saddle is adjusted to a required position, the fastener is fastened again.

Due to the riders has different body geometry, even though a vendible bicycle has several sizes available, it still occurs that riders with a same figure height proportion need different geometric sizes. The only one measure of providing a translation adjustment range of the seat rail of the saddle relative to the seat tube is limited by the shape of the seat rail and not enough to get appropriate adjustments. Although the translation adjustment range can be increased by lengthening the horizontal adjustment section of the seat rail, but it would increase the weight of the saddle; and due to riding too forwards or too backwards, the stiffness is not enough and the riding would be swayed like a seesaw which causes comfortless feeling.

SUMMARY OF THE INVENTION

Accordingly, the invention is directed to a seat adjusting module for connecting the saddle and the seat tube of a bicycle and the position of the saddle relative to the seat tube can be adjusted.

The invention provides a seat adjusting module suitable for connecting the saddle and the seat tube of a bicycle. The saddle includes at least a seat rail. The seat adjusting module includes a base, a clamp unit and a fastening unit. The base is suitable to be assembled to an end of the seat tube. The clamp unit includes a first clamp element and a second clamp element. The first clamp element has at least a first clamp portion and a shaft portion, wherein the shaft portion is matched to the base at a first position or a second position so as to correspondingly rotate on a first rotation axis or a second rotation axis relative to the base. The second clamp element has at least a second clamp portion, and the second clamp portion and the first clamp portion together are suitable to clamp the seat rail. The fastening unit includes a first fastener and a second fastener. The second fastener and the first fastener together fasten the first clamp element and the second clamp element to the base so that the first clamp portion and the second clamp portion together clamp tightly the seat rail.

Based on the depiction above, the invention uses the shaft portion of the first clamp element matched to the base at the first position or the second position so as to increase the translation adjustment range of the saddle relative to the seat tube.

In order to make the aforementioned and other features and advantages of the invention comprehensible, several exemplary embodiments accompanied with figures are described in detail below.

DESCRIPTION OF THE EMBODIMENTS

Figure 1:
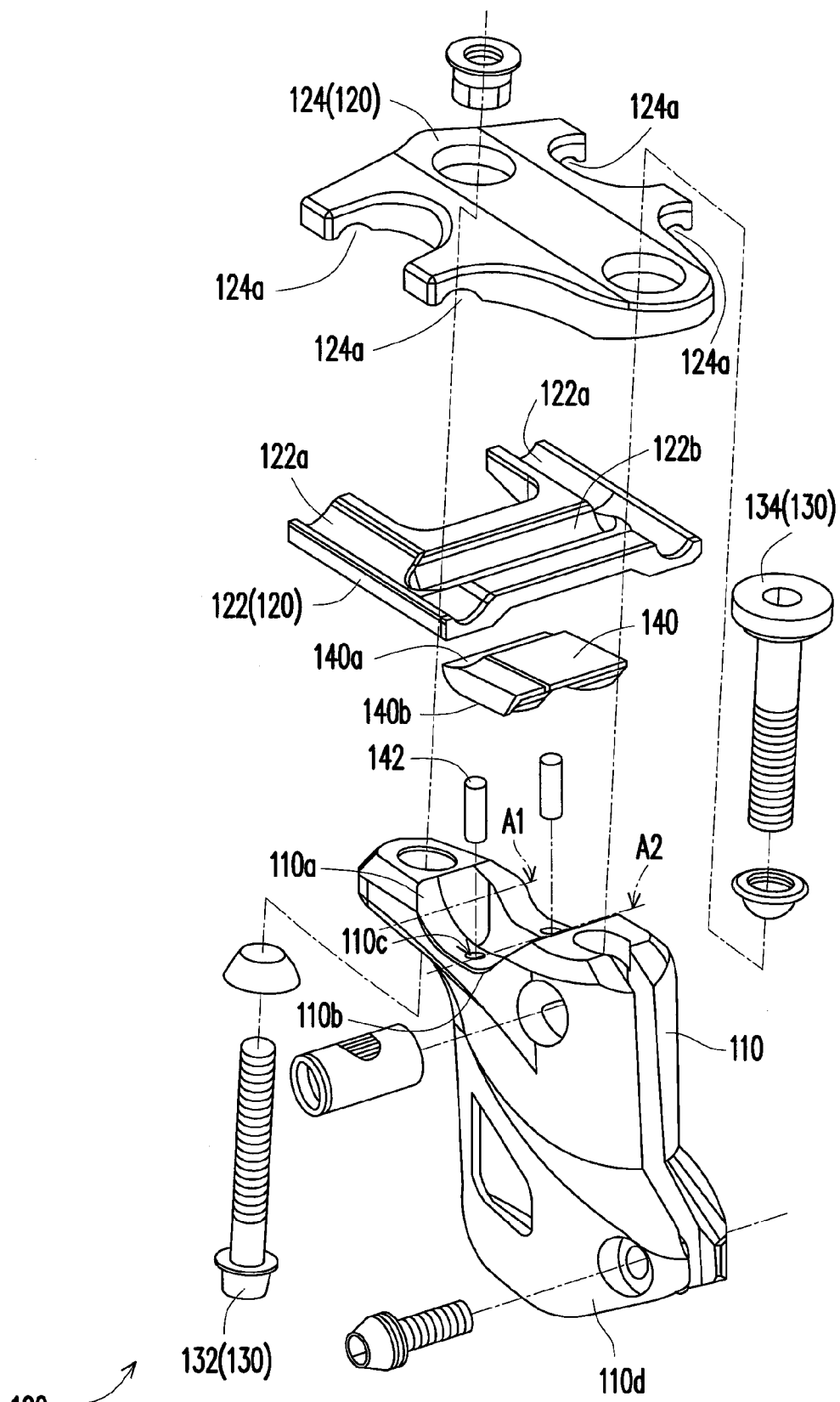
FIG. 1 is an exploded view of a seat adjusting module according to an embodiment of the invention.

Reference will now be made in detail to the preferred embodiments of the invention, examples of which are illustrated in the accompanying drawings. Wherever possible, the same reference numbers are used in the drawings and the description to refer to the same or like parts.

Figure 2A:
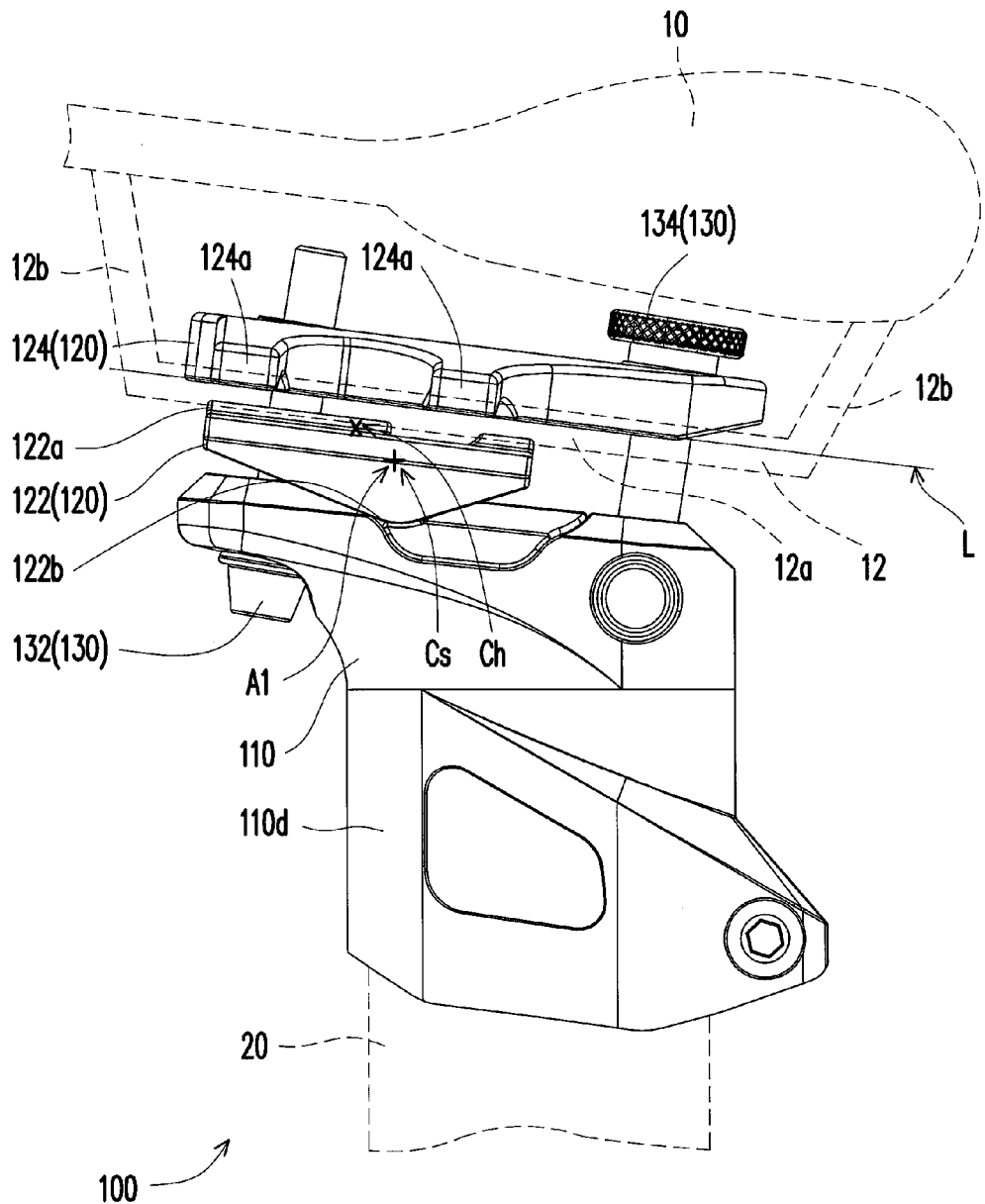
FIG. 2A is a side view of the seat adjusting module of FIG. 1 after assembling at a first position.
Figure 3A:
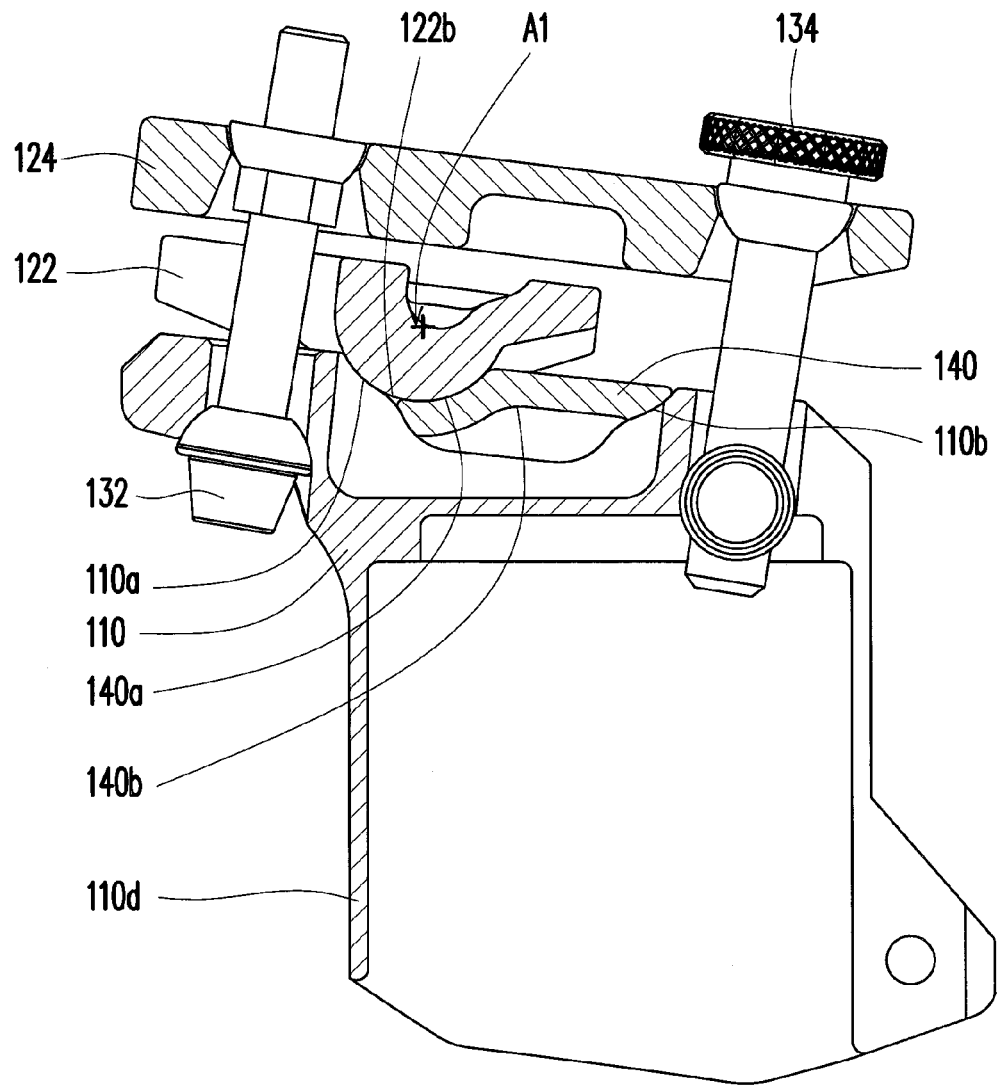
FIG. 3A is a cross-sectional view of the seat adjusting module of FIG. 2A at the first position.

FIG. 1 is an exploded view of a seat adjusting module according to an embodiment of the invention, FIG. 2A is a side view of the seat adjusting module of FIG. 1 after assembling at a first position and FIG. 3A is a cross-sectional view of the seat adjusting module of FIG. 2A at the first position. Referring to FIGS. 1, 2A and 3A, a seat adjusting module 100 of the embodiment is suitable to connect a saddle 10 and a seat tube 20 of a bicycle and is able to adjust the position of the saddle 10 relative to the seat tube 20. In the embodiment, the saddle 10 includes a pair of seat rails 12, wherein each of the seat rails 12 has an adjustment section 12a and two connection sections 12b and the two connection sections 12b extend from both ends of the adjustment section 12a to the bottom of the saddle 10. By using the seat adjusting module 100, the saddle 10 can have a larger translation adjustment range relative to the seat tube 20.

The seat adjusting module 100 includes a base 110, a clamp unit 120 and a fastening unit 130. The base 110 is suitable to be assembled to the seat tube 20, the clamp unit 120 is suitable to clamp the pair of seat rails 12 and position the pair of seat rails 12 onto the base 110 and the fastening unit 130 fastens the clamp unit 120 to the base 110 so that the clamp unit 120 clamps tightly the pair of seat rails 12.

In the embodiment, a glidingly joining portion 110d of the base 110 is sheath-likely disposed at an end of the seat tube 20, followed by screwing down the fastener into the base 110 so as to assemble the base 110 to the seat tube 20. In another unshown embodiment, the base can be connected to a seat post, which is inserted to an end of the seat tube 20, so as to be assembled to an end of the seat tube 20.

The clamp unit 120 includes a first clamp element 122 and a second clamp element 124, and the first clamp element 122 and the second clamp element 124 together are suitable to clamp the pair of seat rails 12. The first clamp element 122 has a pair of first clamp portions 122a and a shaft portion 122b. The second clamp element 124 has a pair of second clamp portions 124a, and each of the second clamp portions 124a and the corresponding first clamp portion 122a together are suitable to clamp the corresponding seat rail 12.

The fastening unit 130 includes a first fastener 132 and a second fastener 134. The first fastener 132 and the second fastener 134 together fasten the first clamp element 122 and the second clamp element 124 to the base 110, so that the first clamp portions 122a and the second clamp portions 124a together clamp tightly the seat rails 12. In the embodiment, the shaft portion 122b is located between the first fastener 132 and the second fastener 134.

Referring to FIGS. 1, 2A and 3A, when the first clamp element 122 is located at a first position relatively to the base 110, after unfastening the first fastener 132 and the second fastener 134, the adjustment section 12a can move about between the first clamp portions 122a and the second clamp portions 124a, so that the saddle 10 can translate along an extension line L of an adjustment section 12a of the seat rail 12 relatively to the seat tube 20. After that, when the saddle 10 is translated to a required position, the first fastener 132 and the second fastener 134 are fastened, which makes the first clamp portions 122a and the second clamp portions 124a clamp tightly the seat rails 12 again.

Referring to FIGS. 1, 2A and 3A, the seat adjusting module 100 further includes an adjustment element 140, which has a first sub bearing portion 140a, and the base 110 has a second sub bearing portion 110a and a third sub bearing portion 110b. The first sub bearing portion 140a and one of the second sub bearing portion 110a and the third sub bearing portion 110b together can form a bearing to match the shaft portion 122b, wherein an arc border is formed between the bearing and the shaft portion 122b.

Continuously to FIGS. 1, 2A and 3A, when the shaft portion 122b of the first clamp element 122 is matched to the first sub bearing portion 140a of the adjustment element 140 and the second sub bearing portion 110a of the base 110, as shown in FIG. 3A, after unfastening the first fastener 132 and the second fastener 134, the shaft portion 122b can rotate on a first rotation axis A1 relatively to the first sub bearing portion 140a and the second sub bearing portion 110a, so that the saddle 10 rotates to the required angle relatively to the seat tube 20. Then, after the saddle 10 rotates to the required position, the first fastener 132 and the second fastener 134 are fastened to fix the shaft portion 122b to a position relative to the first sub bearing portion 140a and the second sub bearing portion 110a.

Figure 2B:
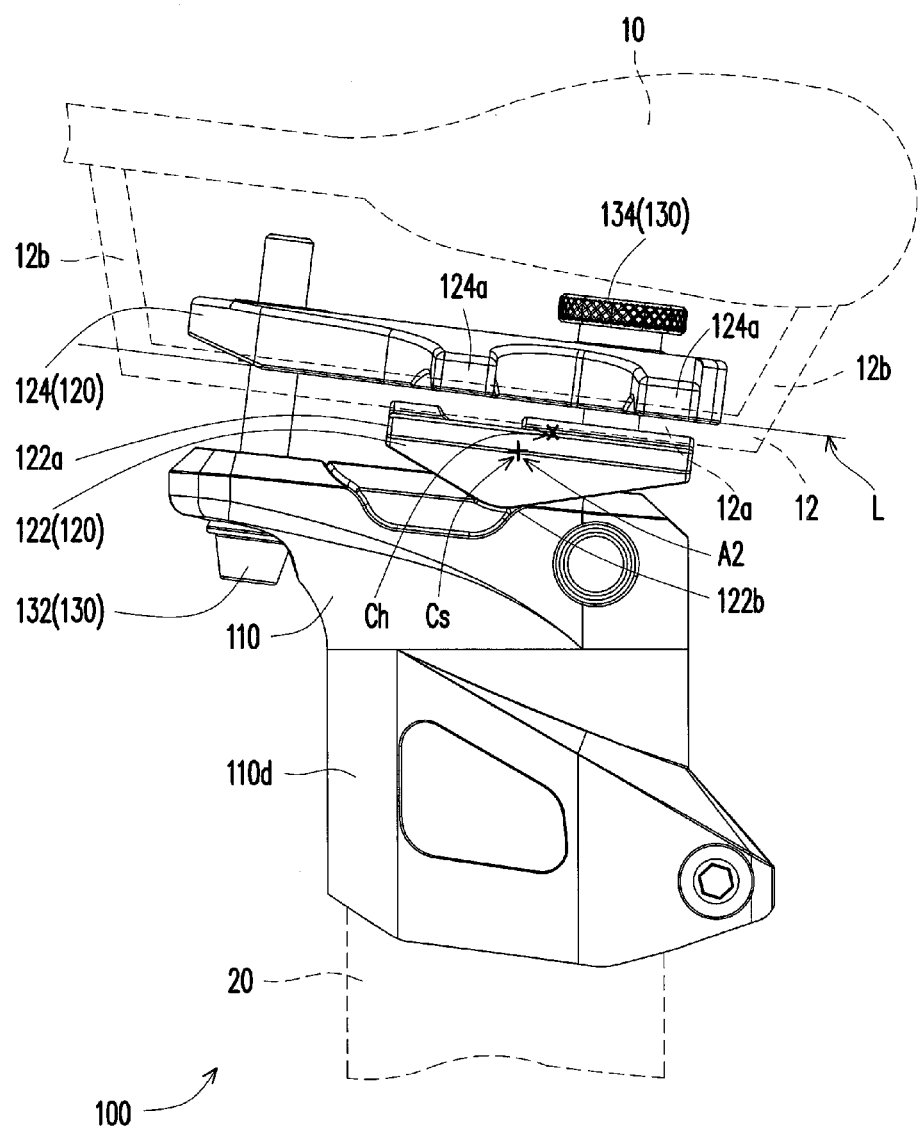
FIG. 2B is a side view of the seat adjusting module of FIG. 1 after assembling at a second position.
Figure 3B:
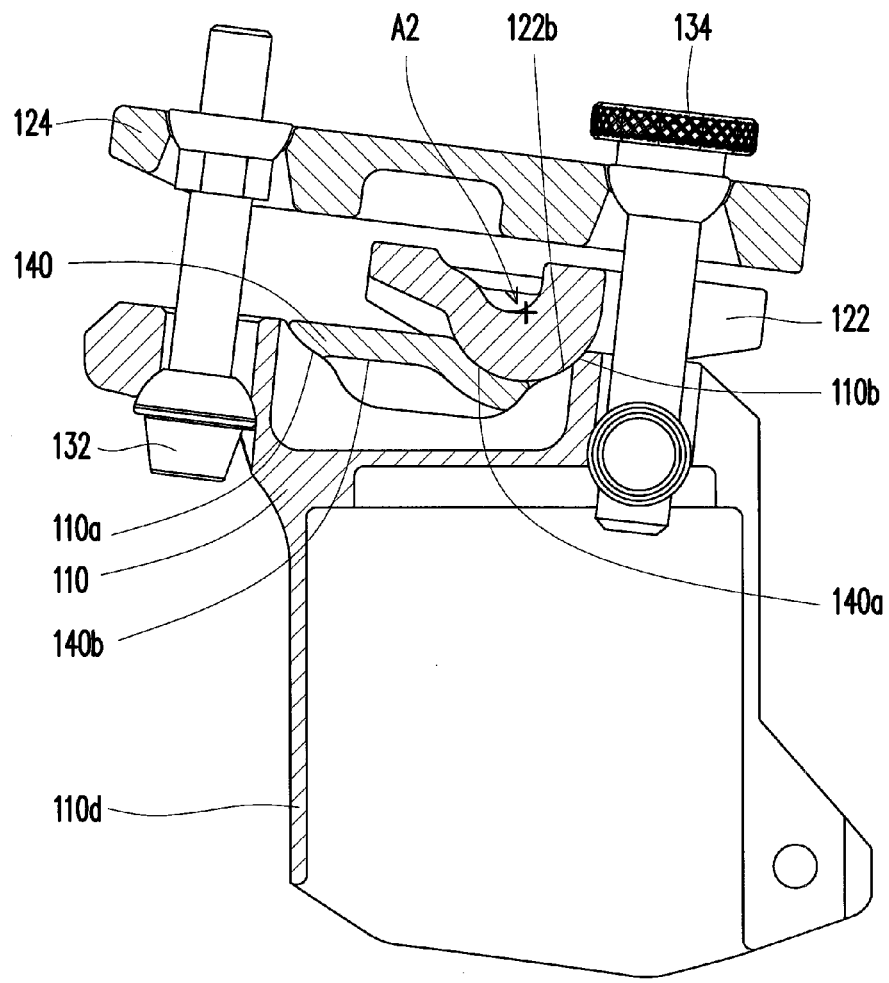
FIG. 3B is a cross-sectional view of the seat adjusting module of FIG. 2B at the second position.

FIG. 2B is a side view of the seat adjusting module of FIG. 1 after assembling at a second position and FIG. 3B is a cross-sectional view of the seat adjusting module of FIG. 2B at the second position. Referring to FIGS. 1, 2B and 3B, after detaching the first fastener 132 and the second fastener 134, reversely installing the first clamp element 122, the second clamp element 124 and the adjustment element 140 at the base 110 and temporarily fastening the first fastener 132 and the second fastener 134, the first clamp element 122 changes the position thereof relative to the base 110 from the first position of FIGS. 2A and 3A to a second position shown in FIGS. 2B and 3B. The adjustment section 12a can move about between the first clamp portions 122a and the second clamp portions 124a so that the saddle 10 can translate along the extension line L of an adjustment section 12a of the seat rail 12 relatively to the seat tube 20. Then, after the saddle 10 translates to the required position, the first fastener 132 and the second fastener 134 are fastened so that the first clamp portions 122a and the second clamp portions 124a clamp tightly the seat rails 12 again.

It should be noted that the embodiment is based on reversely installing the first clamp element 122, the second clamp element 124 and the adjustment element 140 at the base 110 for explanation. In another unshown embodiment, the first clamp element 122 and the second clamp element 124 are installed without taking the reverse orientation, wherein only the adjustment element 140 is reversely installed at the base 110. In still another unshown embodiment, the adjustment element 140 and one of the first clamp element 122 and the second clamp element 124 together are reversely installed at the base 110.

Referring to FIGS. 1, 2B and 3B, when the shaft portion 122b of the first clamp element 122 is matched to the first sub bearing portion 140a of the adjustment element 140 and the third sub bearing portion 110b of the base 110, after unfastening the first fastener 132 and the second fastener 134, the shaft portion 122b can rotate on a second rotation axis A2 relatively to the first sub bearing portion 140a and the third sub bearing portion 110b, so that the saddle 10 rotates to the required angle relatively to the seat tube 20. In the embodiment, the second rotation axis A2 is substantially parallel to the first rotation axis A1. Then, after the saddle 10 rotates to the required position, the first fastener 132 and the second fastener 134 are fastened to fix the shaft portion 122b to a position relative to the first sub bearing portion 140a and the third sub bearing portion 110b.

In the embodiment, the adjustment element 140 can further have a filling portion 140b. When the adjustment element 140 is matched to the base 110 at the first position, as shown in FIGS. 2A and 3A, the filling portion 140b is matched to the third sub bearing portion 110b. In addition, when the adjustment element 140 is matched to the base 110 at the second position, as shown in FIGS. 2A and 3A, the filling portion 140b is matched to the second sub bearing portion 110a. In this way, when the adjustment element 140 is installed at different positions, the second sub bearing portion 110a or the third sub bearing portion 110b both unmatched to the shaft portion 122b can be filled so that the match between the adjustment element 140 and the base 110 is more firm.

Referring to FIG. 1, the adjustment element 140 can further have a pair of pins 142 and the base 110 has a pair of pin holes 110c. When the adjustment element 140 is matched to the base 110 at the first position, the pair of pins 142 are respectively matched to the pair of pin holes 110c. Contrarily, when the adjustment element 140 is matched to the base 110 at the second position, the pair of pins 14 are still respectively matched to the pair of pin holes 110c to limit the five degrees of freedom of the adjustment element 140 relative to the base 110, but allow the adjustment element 140 translating up relatively to the base 110 with the corresponding degree of freedom.

Figure 4:
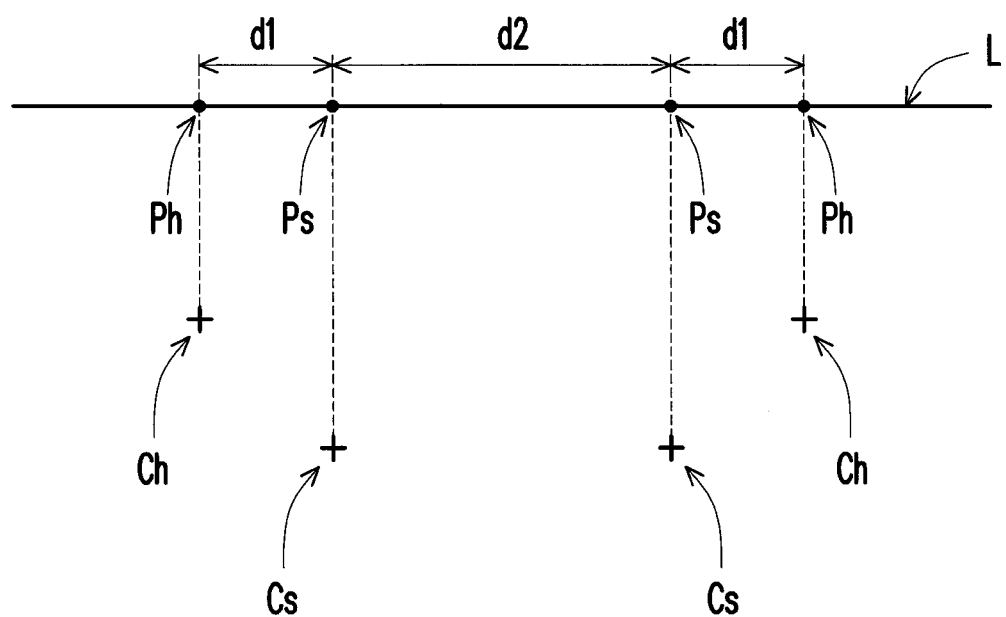
FIG. 4 illustrates the relationships between the extension line of the adjustment section of the seat rail in FIGS. 2A and 2B, the clamp center of the second clamp portion and the two rotation axes.

FIG. 4 illustrates the relationships between the extension line of the adjustment section of the seat rail in FIGS. 2A and 2B, the clamp center of the second clamp portion and the two rotation axes. Referring to FIGS. 2A, 2B and 4, in the embodiment, a shaft portion axis $C_s$ of the shaft portion 122b is substantially superposed with the first rotation axis A1 or the second rotation axis A2 correspondingly to the first position of FIG. 2A or the second position of FIG. 2B. The projection $P_h$ of the clamp center $C_h$ of the second clamp portion 124a on the extension line L is not superposed with the projection $P_s$ of the shaft portion axis $C_s$ of the shaft portion 122b on the extension line L. In other words, there is an interval d1 between the projection of the shaft portion axis $C_s$ of the shaft portion 122b and the projection of the clamp center $C_h$ of the second clamp portion 124a on the extension line L.

Besides, there is also an interval d2 between the two shaft portion axes Cs of the shaft portion 122b respectively at the first position and the second position relative to the base 110 (see FIGS. 2A and 2B). When the seat rails 12 do not move and the first clamp element 122 and the second clamp element 124 reversely move to the second position from the first position, the translation adjustment range of the saddle 10 relative to the seat tube 20 is the sum of and the interval d2 and the double of the interval d1.

Figure 5A:
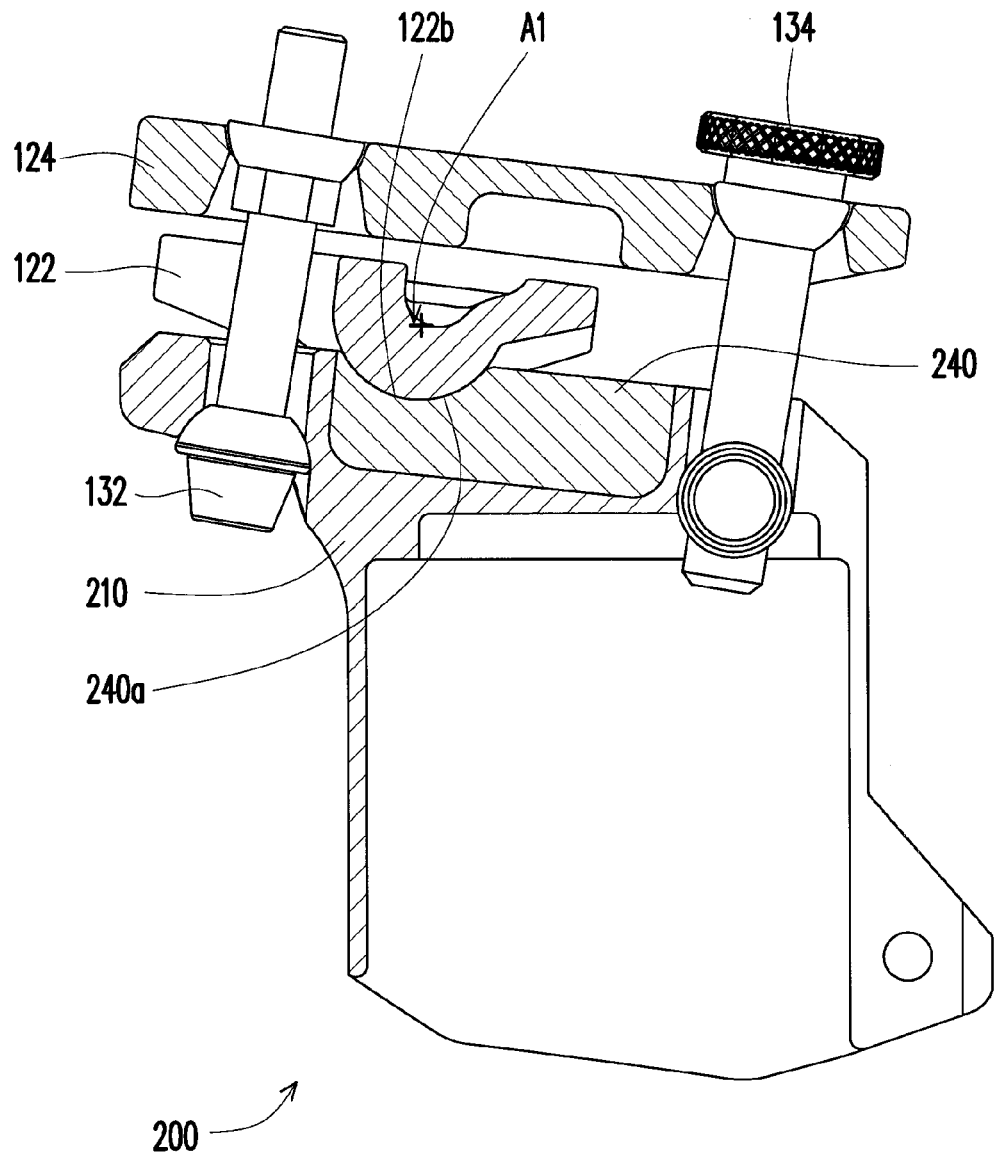
FIG. 5A is a cross-sectional view of the seat adjusting module at the first position according to another embodiment of the invention.
Figure 5B:
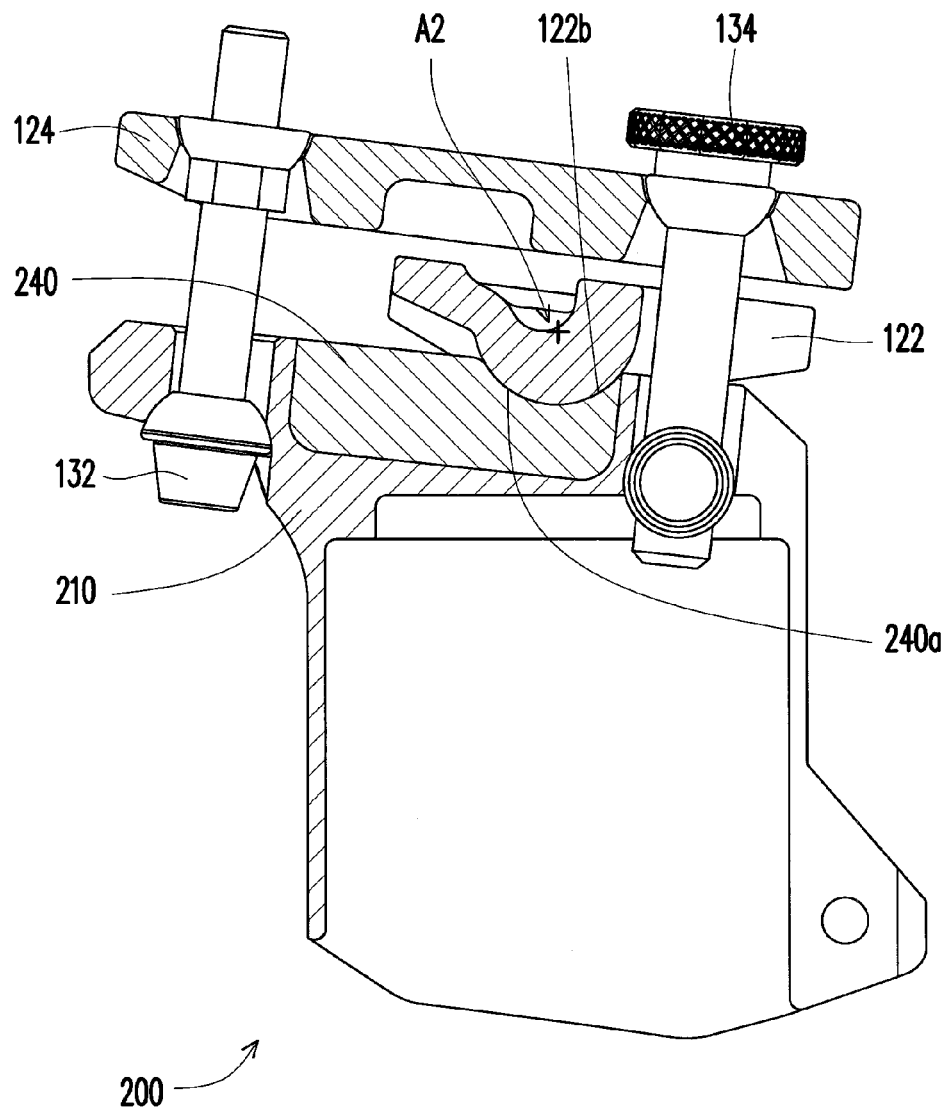
FIG. 5B is a cross-sectional view of the seat adjusting module at the second position according to another embodiment of the invention.

FIG. 5A is a cross-sectional view of the seat adjusting module at the first position according to another embodiment of the invention and FIG. 5B is a cross-sectional view of the seat adjusting module at the second position according to another embodiment of the invention. Referring to FIGS. 5A and 5B, in comparison with the seat adjusting module 100 of FIGS. 3A and 3B, the seat adjusting module 200 of the embodiment further includes an adjustment element 240. The adjustment element 240 has a bearing portion 240a, which can directly form a bearing to match the shaft portion 122b, wherein an arc border is formed between the bearing and the shaft portion 122b. As a result, when the adjustment element 240 is matched to the base 210 at the first position of FIG. 5A or the second position of FIG. 5B, the shaft portion 122b of the first clamp element 122 can be matched to the bearing portion 240a so as to rotate relatively to the base 110 on the first rotation axis A1 of FIG. 5A or the second rotation axis A2 of FIG. 5B.

Figure 6A:
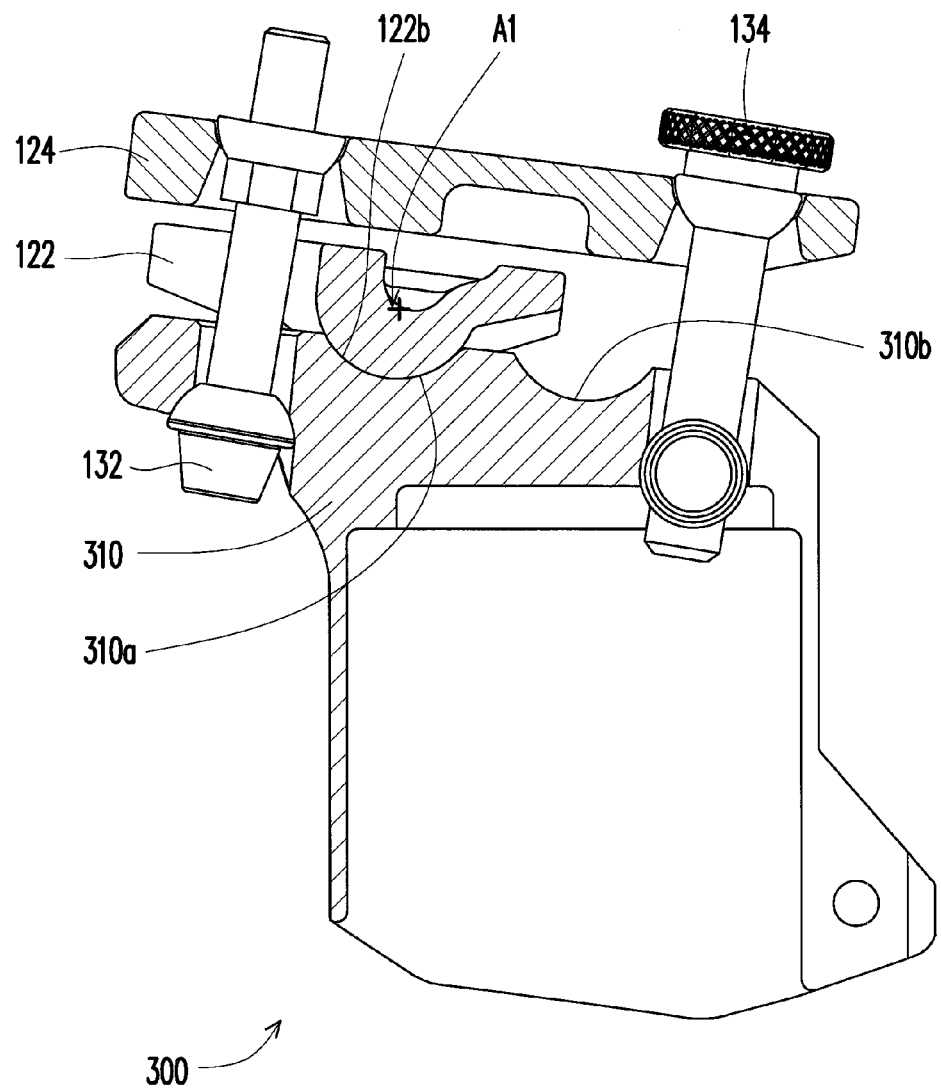
FIG. 6A is a cross-sectional view of the seat adjusting module at the first position according to yet another embodiment of the invention.
Figure 6B:
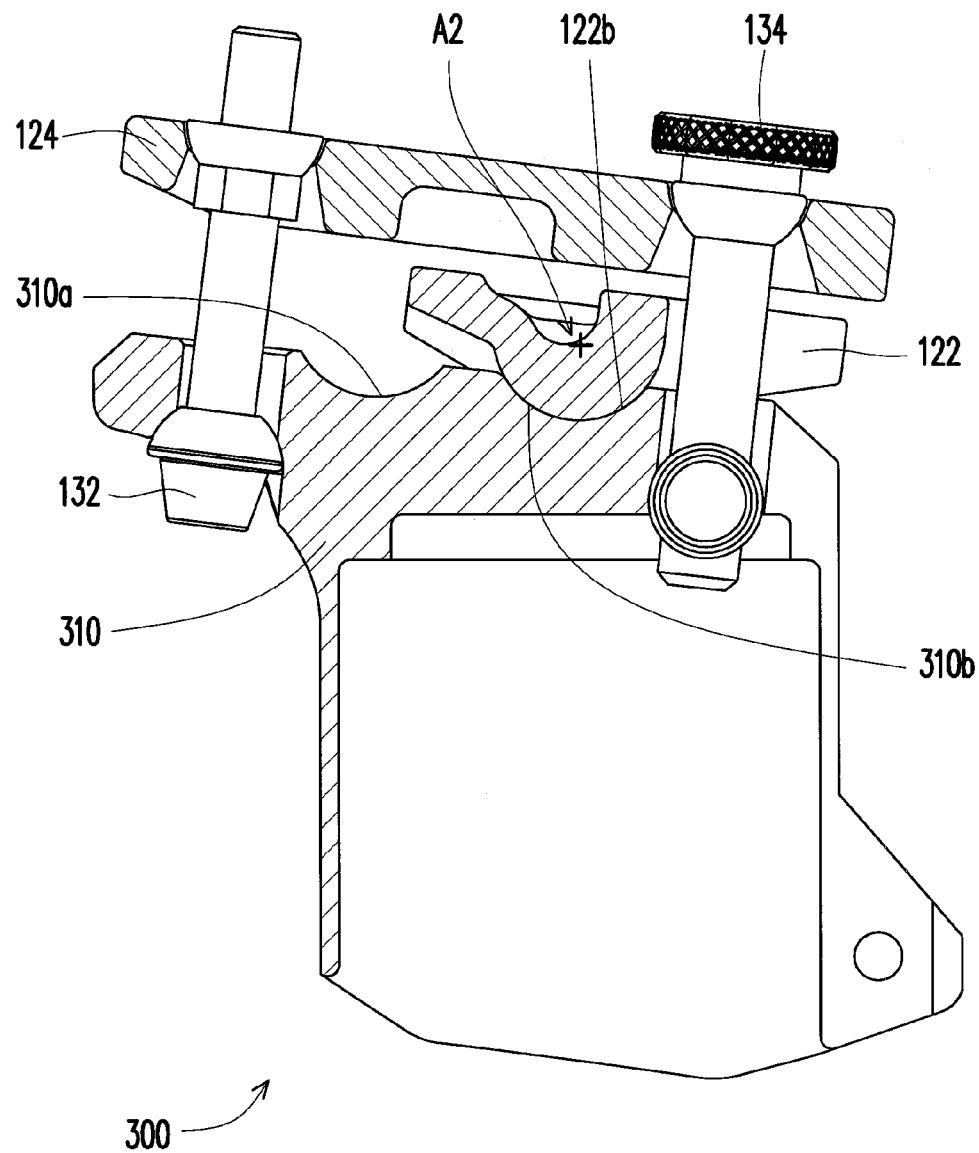
FIG. 6B is a cross-sectional view of the seat adjusting module at the second position according to yet another embodiment of the invention.

FIG. 6A is a cross-sectional view of the seat adjusting module at the first position according to yet another embodiment of the invention and FIG. 6B is a cross-sectional view of the seat adjusting module at the second position according to yet another embodiment of the invention. Referring to FIGS. 6A and 6B, in comparison with the seat adjusting module 100 of FIGS. 3A and 3B, the base 310 of the embodiment has a first bearing portion 310a and a second bearing portion 310b, which can individually form a bearing to match the shaft portion 122b, wherein an arc border is formed between the bearing and the shaft portion 122b. Hence, the shaft portion 122b of the first clamp element 122 can be matched to the first bearing portion 310a or the second bearing portion 310b to rotate relatively to the base 310 on the first rotation axis A1 of FIG. 6A or the second rotation axis A2 of FIG. 6B.

In short, in the above-mentioned embodiments, the shaft portion of the first clamp element can be matched to one or both of the base and the adjustment element. In this way, the position of the saddle relative to the seat tube can be adjusted.

In summary, the present invention utilizes the shaft portion of the first clamp element to be matched to the base at the first position or the second position so as to increase the translation adjustment range of the saddle relative to the seat tube. In addition, when the projection of the clamp center of the first clamp portion on the extension line L is not superposed with the projection of the shaft portion axis of the shaft portion on the extension line L and there is an interval between the two projections, the translation adjustment range of the saddle relative to the seat tube can be further increased.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A seat adjusting module, suitable to connect a saddle and a seat tube of a bicycle, wherein the saddle comprises at least a seat rail; the seat adjusting module comprising:
    a base, suitable to be assembled to an end of the seat tube;
    a clamp unit, comprising:
        a first clamp element, having at least a first clamp portion and a shaft portion, wherein the shaft portion is matched to the base at a first position, the shaft portion rotates on a first rotation axis relative to the base, when the shaft portion is matched to the base at a second position, the shaft portion rotates on a second rotation axis relative to the base, and when the axis on which the shaft portion rotates is changed from one of the first and second rotation axes to the other of the first and second rotation axes, the clamp unit is completely reversed relative to the base; and
        a second clamp element, having at least a second clamp portion, the first clamp portion and the second clamp portion together clamping the seat rail; and
    a fastening unit, comprising:
        a first fastener; and
        a second fastener, the first fastener and the second fastener together fastening the first clamp element and the second clamp element to the base so that the first clamp portion and the second clamp portion together clamping tightly the seat rail.

2. The seat adjusting module as claimed in claim 1, further comprising:
    an adjustment element, having a first sub bearing portion, wherein the base has a second sub bearing portion and a third sub bearing portion, when the adjustment element is matched to the base at the first position, the shaft portion matches the first sub bearing portion and the second sub bearing portion so as to rotate relatively to the base on the first rotation axis, and when the adjustment element is matched to the base at the second position, the shaft portion matches the first sub bearing portion and the third sub bearing portion so as to rotate relatively to the base on the second rotation axis.

3. The seat adjusting module as claimed in claim 2, wherein the adjustment element has a filling portion, when the adjustment element is matched to the base at the first position, the filling portion is matched to the third sub bearing portion, and when the adjustment element is matched to the base at the second position, the filling portion is matched to the second sub bearing portion.

4. The seat adjusting module as claimed in claim 2, wherein the adjustment element has a plurality of pins, the base has a plurality of pin holes, and the pins are respectively matched to the pin holes at the first position or the second position.

5. The seat adjusting module as claimed in claim 1, further comprising:
    an adjustment element, having a bearing portion, wherein when the adjustment element is matched to the base at the first position, the shaft portion matches the bearing portion so as to rotate relatively to the base on the first rotation axis, and when the adjustment element is matched to the base at the second position, the shaft portion matches the bearing portion so as to rotate relatively to the base on the second rotation axis.

6. The seat adjusting module as claimed in claim 5, wherein the adjustment element has a plurality of pins, the base has a plurality of pin holes, and the pins are respectively matched to the pin holes at the first position or the second position.

7. The seat adjusting module as claimed in claim 1, wherein the base has a first bearing portion and a second bearing portion, the shaft portion is matched to the first bearing portion or the second bearing portion to rotate relatively to the base on the first rotation axis or the second rotation axis.

8. The seat adjusting module as claimed in claim 1, wherein a shaft portion axis of the shaft portion is substantially superposed with the first rotation axis or the second rotation axis correspondingly to the first position or the second position, and the projection of the clamp center of the second clamp portion on an extension line of an adjustment section of the seat rail is not superposed with the projection of the shaft portion axis on the extension line.

9. The seat adjusting module as claimed in claim 1, wherein the second rotation axis is substantially parallel to the first rotation axis.

10. The seat adjusting module as claimed in claim 1, wherein the shaft portion is located between the first fastener and the second fastener.

* * * * *